INVENTOR:
FRANZ RIEDEL
BY Michael J. Striker
his ATTORNEY

United States Patent Office 3,363,493
Patented Jan. 16, 1968

3,363,493
APPARATUS FOR SHAVING PIPES
AND THE LIKE
Franz Riedel, Solingen, Germany, assignor to
Th. Kieserling & Albrecht, Solingen, Germany
Filed Aug. 3, 1965, Ser. No. 476,961
Claims priority, application Germany, Aug. 19, 1964,
K 53,794
8 Claims. (Cl. 82—20)

ABSTRACT OF THE DISCLOSURE

A trailing carriage transporting a workpiece toward a cutting device is moved at a high speed in the feeding direction until the workpiece abuts another workpiece transported by a leading carriage at a lower working speed so that the trailing carriage is slowed down to the working speed which causes shifting of the transmission driving the trailing carriage to another stage for driving the trailing carriage at the working speed.

---

The present invention relates to material removing apparatus in general, and more particularly to improvements in apparatus which may be utilized for shaving the exterior of solid rods, pipes and similar elongated workpieces of circular cross section. Still more particularly, the invention relates to improvements in shaving apparatus for metallic pipes, solid metallic rods and similar elongated workpieces wherein a workpiece is fed lengthwise and is held against rotation while advancing past one or more orbiting cutters which revolve around the periphery of and simultaneously remove shavings from the advancing workpiece.

In conventional shaving apparatus, the workpieces are fed to and are thereupon withdrawn from the shaving or material removing station by means of driven rolls which rotate about fixed axes, or by means of reciprocable holders or carriages. In apparatus wherein the feed includes driven rolls, the workpieces may form a single file of end-to-end arranged abutting members. This is of advantage because a rotary cutter, particularly one consisting of hard metal, which remains in uninterrupted material removing engagement with the moving stock is much less likely to break or to undergo uneven wear, and also because the apparatus then operates at maximum capacity. In such apparatus, the driven rolls include a first set of rolls which advance the workpieces seriatim to the cutter or cutters and a second set of rolls which are driven at a higher speed than the first set and which advance workpieces to the first set of rolls whereby the leading end of a workpiece which is being fed by the second set of rolls invariably catches up and comes into actual abutment with the trailing end of the preceding workpiece.

However, in heretofore known shaving apparatus wherein the workpieces are fed by holders or carriages, the workpieces cannot be advanced end-to-end so that the output of such apparatus is rather low and the cutters are likely to break, particularly at the moment when they engage the periphery at the leading end of a fresh workpiece. This is due to the fact that the drive for such carriages can insure synchronous advance of carriages during a part of movement in the feed direction but cannot control the speed of the front carriage during the remainder of feed movement so that the workpieces advancing through the shaving station form a staggered row wherein the trailing end of each preceding workpiece is spaced from the leading end of the next-following workpiece.

Accordingly, it is a primary object of my invention to provide a shaving apparatus for pipes, solid rods and similar elongated workpieces wherein the stock is fed by two reciprocable holders or carriages and wherein the drive for the carriages is constructed and assembled in such a way that the workpieces may be fed in a single file in end-to-end relation and invariably form a continuous uninterrupted body of stock.

Another object of the invention is to provide an apparatus of the just outlined characteristics wherein each of the two holders or carriages can be accelerated independently of the other carriage while moving in the direction of feed so that the front carriage can move nearer to the rear carriage during a first stage of feed movement, that the two carriages may move at the same speed during another stage, and that the rear carriage can move further away from the front carriage during a third stage of movement in the direction of feed.

A further object of the invention is to provide a novel method of operating a shaving apparatus of the above outlined characteristics.

Briefly state, one feature of my present invention resides in the provision of an apparatus for removing material from the exterior of elongated workpieces of circular cross-sectional outline. In its simplest form, the apparatus comprises material removing means defining a shaving station and including at least one cutter arranged to orbit about a fixed axis to thereby remove material from workpieces which advance in a feed direction along the fixed axis, advancing or feeding means including a first and a second holder or carriage respectively located ahead of and past the material removing means and each reciprocable in the longitudinal direction of the fixed axis so that the first carriage delivers workpieces to the cutter during movement in the feed direction toward the shaving station and the second carriage removes workpieces from the shaving station during movement away from the cutter, and a drive for reciprocating the carriages including means for advancing the carriages at the same speed during a certain portion of movement in the direction of feed and means for alternatively accelerating the carriages during the remainder of movement in the direction of feed so that the first carriage may be moved nearer to the second carriage at the beginning of its feed stroke and that the second carriage may be moved further away from the first carriage toward the end of its withdrawing stroke.

An important advantage of the just described apparatus is that, after returning to its starting position (i.e., after completing its stroke in a direction counter to the direction of feed), the first carriage may rapidly advance a fresh workpiece toward the shaving station so that the leading end of the fresh workpiece comes into actual abutment with the trailing end of the preceding workpiece. Also, when the trailing end of a workpiece moves beyond the cutter, the second carriage may be accelerated to rapidly advance such finished workpiece to a position for removal from the apparatus. The second carriage then returns toward the shaving station and engages the next-following workpiece.

The novel features which are considered as characteristic of the invention are set forth in particular in the appended claims. The improved material removing apparatus itself, however, both as to its construction and its mode of operation, together with additional features and advantages thereof, will be best understood upon perusal of the following detailed description of a specific embodiment with reference to the accompanying drawings, in which:

Figure 1:
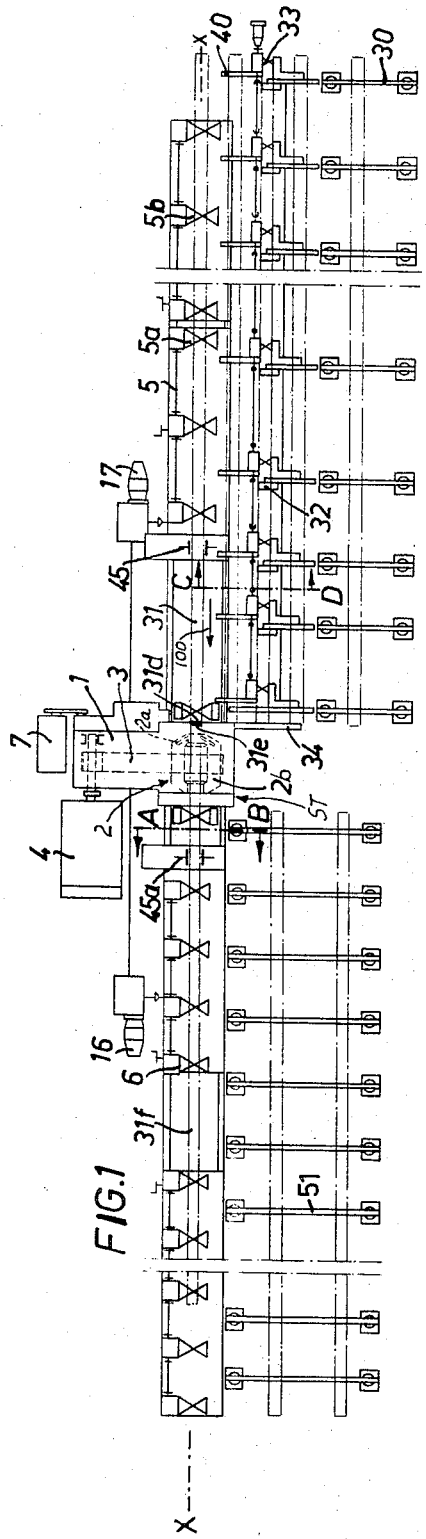
FIG. 1 is a diagrammatic top plan view of a material removing apparatus which embodies my invention.

Referring to the drawings, FIG. 1 illustrates a shaving or material removing apparatus which comprises a material removing device 2 defining a shaving station ST and including one or more cutters 2a which orbit about a fixed axis X—X to thereby remove material from the exterior of elongated workpieces 31. In the illustrated embodiment, the workpieces are sections of metallic pipe which advance in a direction from the left to the right, as viewed in FIG. 1. The direction of feed is indicated by an arrow 100. The material removing device 2 is mounted in a housing 1 and its head 2b (which accommodates the cutters 2a) is driven by a toothed belt 3 which receives motion from a variable-speed electric motor 4.

The advancing or feeding unit of the apparatus includes two holders or carriages 5 and 6 which are respectively located ahead of and past the shaving station ST. These carriages are reciprocable in the direction of the axis X—X whereby the front carriage 5 feeds the pipes 31 seriatim toward the station ST when it performs a working stroke in the feed direction 100, and the rear carriage 6 removes finished workpieces 31f from the station ST when it moves in a direction away from the shaving head 2b.

Figure 2:
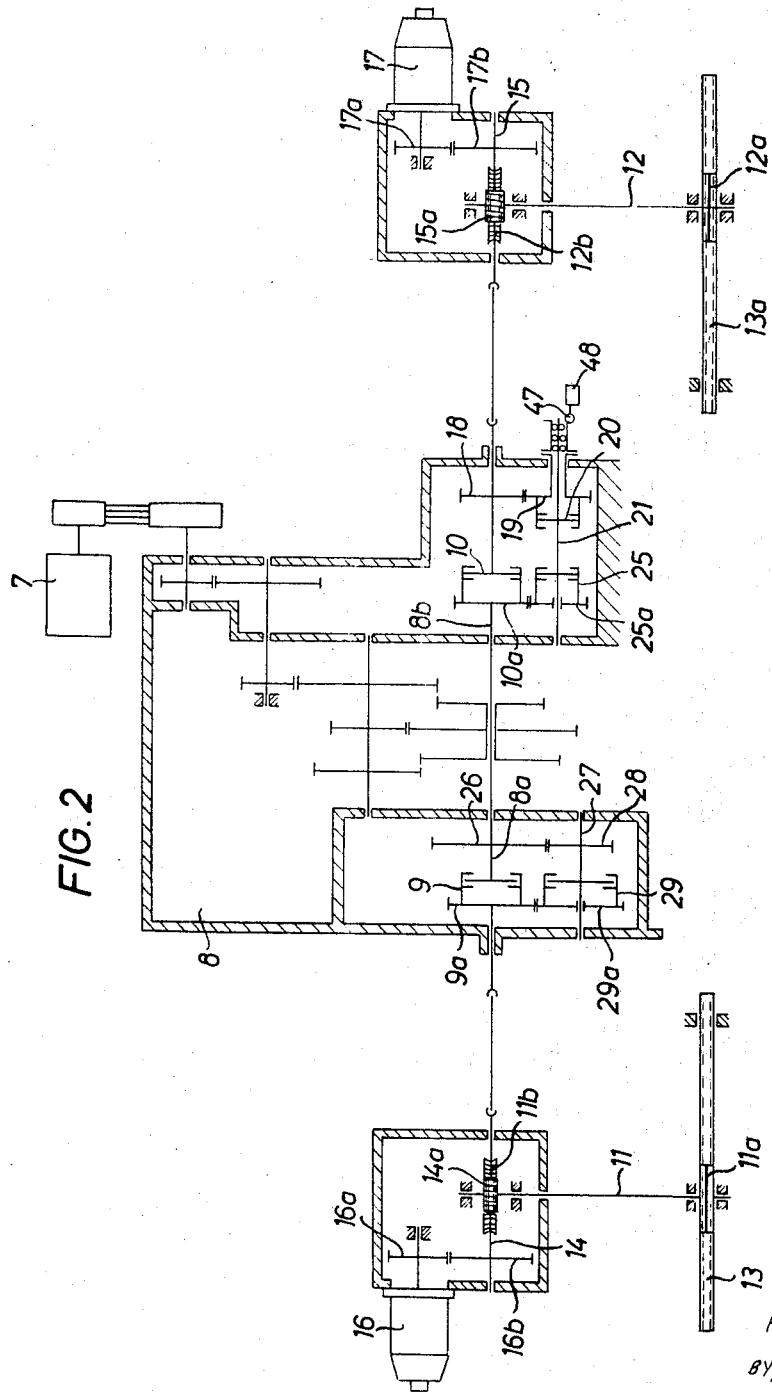
FIG. 2 is an enlarged diagrammatic sectional view of the drive for the two carriages.

The drive for the carriages 5 and 6 includes a variable-speed electric motor 7 and a variable-speed transmission 8. The motors 4 and 7 are detachably coupled to each other by a so-called electric shaft so that their rotational speed may be increased or reduced in a simultaneous step. The transmission 8 comprises two output shafts 8a and 8b (see particularly FIG. 2) which respectively drive "working speed" clutches or couplings 9 and 10. The clutch 9 can drive a shaft 11 which carries a pinion 11a meshing with a rack 13 which is rigid with the rear carriage 6. The clutch or coupling 10 can drive a shaft 12 which carries a pinion 12a meshing with a second rack 13a which is rigid with the front carriage 5 which trails rear carriage 6 in the feeding direction (arrow 100). The shaft 11 carries a worm wheel 11b which meshes with a worm 14a mounted on a worm shaft 14. The shaft 14 carries a gear 16b meshing with a gear 16a mounted on the output shaft of an electric motor 16 which serves to rapidly return the rack 13 (and hence the rear carriage 6) back to starting position, i.e., to move the carriage 6 counter to the direction of feed (arrow 100) and toward the shaving station ST.

Figure 3:
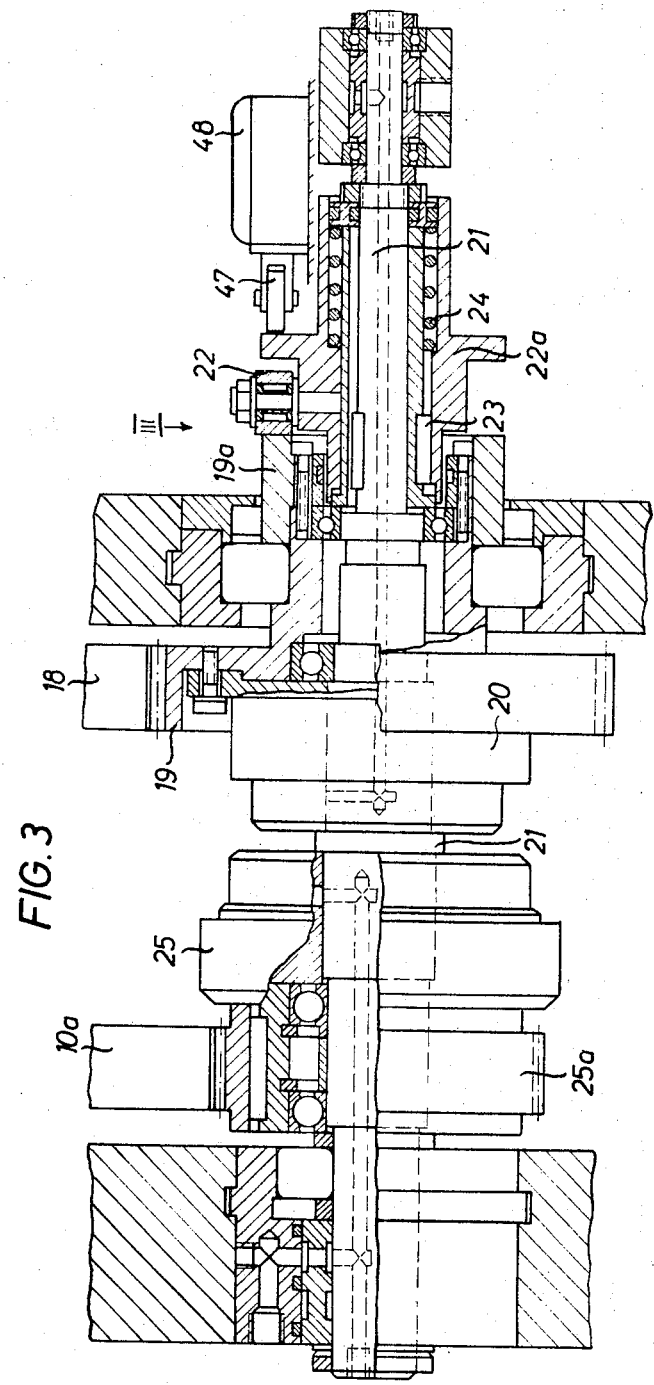
FIG. 3 is an enlarged fragmentary view of a detail of the structure shown in FIG. 2.
Figure 3A:
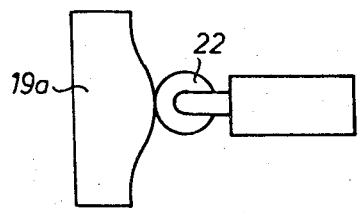
FIG. 3a is a schematic end elevational view as seen in the direction of the arrow III of FIG. 3.

The shaft 12 carries a worm wheel 12b meshing with a worm 15a on a worm shaft 15 which carries a gear 17b meshing with gear 17a on the output shaft of an electric motor 17. This motor 17 is operated when the rack 13a (and hence the front carriage 5) is to rapidly return back to its starting position, i.e., counter to the direction of feed (arrow 100) and away from the shaving station ST. The worm 14a may be driven by the motor 16 or by the motor 7, and the worm 15a may be driven by the motor 17 or by the motor 7. When operatively connected with the racks 13 and 13a, the motor 7 drives the carriages 5 and 6 in the direction of feed which is indicated by the arrow 100. The motor 16 is started when the control unit of the shaving apparatus disengages the worm 14a from the motor 7, and the motor 17 is started when the control unit disengages the worm 15a from the motor 7. The power train between the motor 7 and the worm 14a includes a "high speed" clutch 29 which is disconnected when the motor 16 is started and/or when the clutch 9 is operative. A second "high speed" clutch or coupling 25 is disconnected when the worm 15a is coupled with a gear 18 which meshes with a gear 19, the latter forming part of a friction clutch 20 which is mounted on a shaft 21. The gear 19 on the output part of clutch 20 is rigid with a cam 19a (see FIGS. 3 and 3a) which causes a roller follower 22 to move in the axial direction of the shaft 21 when the gear 19 rotates with reference to this shaft. The follower 22 is rotatable in a holder 22a which is movable axially of the shaft 21 but is held against rotation with reference thereto by a series of keys 23. A helical spring 24 biases the holder 22a in a direction to the left, as viewed in FIG. 3, so that the follower 22 remains in permanent abutment with the face of the cam 19a.

The gear 25a of the clutch 25 meshes with the gear 10a of the clutch 10, and the gear 10a is rigid with the output shaft 8b. The output shaft 8a carries a gear 26 which meshes with a gear 28 on the shaft 27 of the clutch 29. This clutch includes a gear 29a which meshes with the gear 9a of the clutch 9.

The operation of the shaving apparatus is as follows:

Unshaven pipes 31 are stored on a grate or rack 30 shown in the right-hand part of FIG. 1. Such pipes are parallel to the axis X—X and must be transferred sideways in order to be ready for attachment to and for movement with the front carriage 5. The transfer mechanism comprises a series of lifters 32 one of which is shown in detail in FIG. 5. These lifters 32 serve to transfer the pipes 31 seriatim onto a set of driven rolls 33 whose axes are normal to the axis X—X and which advance the pipes 31 lengthwise so that the leading end of a pipe resting on the rolls 33 comes into abutment with a fixed stop 34 shown in FIG. 1. The means for actuating the lifters 32 comprises a double-acting hydraulic or pneumatic cylinder 35 (see FIG. 5) whose piston rod 35a is coupled to one arm of a bell crank lever 36a rigidly secured to a horizontal shaft 36 which is parallel with the axis X—X. The shaft 36 is rigidly connected with a series of one-armed levers 37 each of which is articulately coupled to a link 38, and each link 38 is articulately coupled to a vertically movable pusher 39 operating one of the lifters 32. When the lifters 32 are raised, they lift the pipe 31a off the driven rolls 33 and to such a level that the pipe can roll onto an inclined second grate 40. At the same time, the lifters 32 transfer a fresh pipe 31 from the grate 30 onto the rolls 33.

Figure 5:
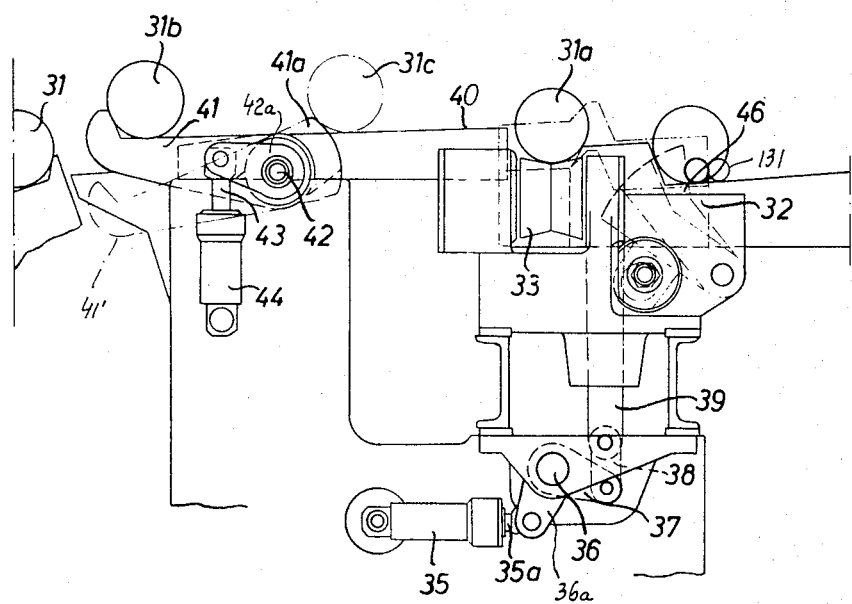
FIG. 5 is a similar enlarged transverse vertical section substantially as seen in the direction of arrows from the line C–D of FIG. 1.

The pipe 31a rolls along the second grate 40 and reaches the position 31b shown in FIG. 5. In such position, the pipe engages the noses of a second set of lifters 41 which are fixed to a horizontal shaft 42. The shaft 42 may be rocked back and forth by a second double-acting cylinder 44 whose piston rod 43 is articulately connected with a link 42a, the latter being rigid with the shaft 42. Each lifter 41 is movable between the solid-line position of FIG. 5 in which its nose arrests the pipe 31b and a phantom-line position 41' in which its rounded rear portion 41a arrests the next-following pipe 31c on an intermediate portion of the second grate 40. Thus, the rear portions 41a insure that only one pipe at a time can reach the position occupied by the pipe 31b shown in FIG. 5. When the lifters 41 move to the positions 41', the pipe 31b can roll off the grate 40 and into the clamping device 45 of the front carriage 5. The clamping device 45 insures that the pipe 31 cannot rotate during travel through the shaving station ST.

The lifters 32 cooperate with adjustable stops 46 (see FIG. 5) which are needed to prevent simultaneous transfer of two or more smaller-diameter workpieces 131 onto the grate 40.

The trailing front carriage 5 is provided with supporting rolls 5a which are aligned with stationary supporting rolls 5b, see FIG. 1. When a pipe 31 enters the clamping device 45 of the carriage 5, its front portion rests on the rolls 5a and its rear portion rests on the rolls 5b. The control unit of the apparatus then closes the jaws of the clamping device 45 so that the pipe 31 is held against rotation and the clutch 25 is actuated in a sense to transmit motion from the output shaft 8b via meshing gears 10a, 25a, shaft 21, clutch 20, meshing gears 19, 18, worm 15a, worm wheel 12b, shaft 12, pinion 12a and rack 13a whereby the front carriage 5 advances rapidly in the direction of feed (arrow 100) to feed the pipe 31 toward the station ST and to move the leading end 31d of this pipe into actual abutment with the trailing end 31e of the preceding pipe 31f which latter is being shaved during passage through the revolving head 2b while transported by the leading rear carriage 6. As soon as the pipe 31 comes into actual abutment with the pipe 31f, the speed of the trailing front carriage 5 is reduced so that the two carriages 5 and 6 then move at the same speed. Such reduction in the speed of the trailing front carriage 5 causes slipping of the friction clutch 20 and the gear 19 on the output part of clutch 20 turns with reference to the input part of the friction clutch 20 and causes a rotation of the cam 19a whereby the follower 22 moves in a direction to the right, as viewed in FIG. 3 and closes a limit switch 48 whose roller-shaped trip 47 bears against the axially movable holder 22a. The limit switch 48 disengages the "high speed" clutch 25 and engages the "working speed" clutch 10 so that the carriage 5 then advances at a normal speed by being driven from the output shaft 8b via clutch 10, worm 15a, worm wheel 12b, shaft 12, pinion 12a and rack 13a.

When the trailing end 31e of the pipe 31f moves beyond the cutters 2a, the clutch 29 is engaged and the clutch 9 is disengaged so that the motor 7 drives the rear carriage 6 at a higher speed via output shaft 8a, meshing gears 26, 28, shaft 27, meshing gears 29a, 9a, worm 14a, worm wheel 11b, shaft 11, pinion 11a, and rack 13. Such accelerated movement of the rear carriage 6 is important to make sure that the finished pipe 31f may be transferred sideways onto an inclined grate 51 without interfering with the forward progress of the pipe 31 which then advances at a normal speed.

Figure 4:
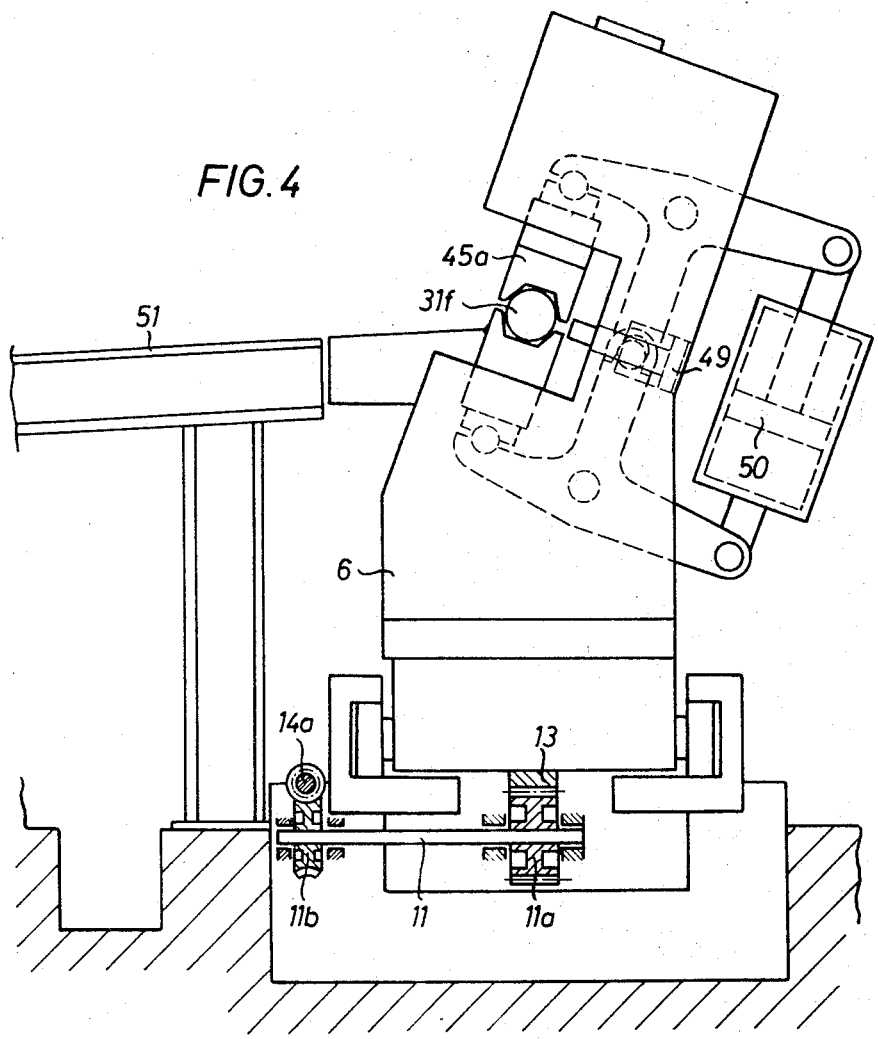
FIG. 4 is an enlarged transverse vertical section substantially as seen in the direction of arrows from the line A–B of FIG. 1.

The rear carriage 6 comprises a clamping device 45a (see FIG. 4) whose jaws are opened when this carriage reaches the end of its feed stroke whereby the pipe 31f rolls onto the grate 51. The means for closing and opening the jaws of the clamping device 45a on the rear carriage 6 comprises a piston and cylinder unit 50, and this carriage also comprises an ejector 49 which compels the finished pipe 31f to leave the space between the clamping jaws as soon as the clamping device 45a assumes its open position.

In the next step, the motor 16 is started to rapidly return the carriage 6 to the starting position (i.e., in a direction to the right, as viewed in FIG. 1), so that the jaws of the clamping device 45a may close again around the next pipe 31 and to take over the feed of the pipe 31. The jaws of the clamping device 45 on the front carriage 5 are then disengaged from the pipe 31, and the motor 17 is started to rapidly return the carriage 5 to its starting position.

The control unit of the shaving apparatus may comprise a number of limit switches, photoelectric cells and analogous control elements which insure that the motors 7, 16, 17, the clutches 9, 10, 25, 29, the cylinders 35, 44, 50, the clamping devices 45, 45a, the ejector 49 and all other movable assemblies are operated in requisite sequence.

It will be seen that the improved shaving apparatus comprises a novel drive which can accelerate the front carriage 5 during the initial stage of movement in the direction of feed (arrow 100) so that the trailing workpiece 31 catches up and comes into actual abutment with the preceding workpiece 31f before the trailing end 31e of the workpiece 31f reaches the shaving cutters 2a. This is achieved by driving the rack 13a of the front carriage 5 through the gear train 10a, 25a, 19, 18 (while the clutch 10 is disconnected and the clutch 25 is active). The transmission ratio of this gear train is relatively high so that the movement of the carriage 5 is faster than at the time when the rack 13a is driven through the clutch 10.

Also, the transmission ratio of the gear train 26, 27, 29a, 9a is higher than the transmission ratio of the unit 9, 9a so that, when the rear carriage 6 is driven through the clutch 29, its speed in the feed direction is higher than at the time when the rack 13 is driven by the clutch 9.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for continuously feeding elongated workpieces in end-to-end relationship along an axis about which a cutting means rotates, comprising, in combination, first and second carriages mounted for reciprocating movement along said axis and being operable in a feeding direction of reciprocation to feed a workpiece at a working speed to said cutting means, and in a return direction to move relative to said workpiece; drive means for said first and second carriages including a motor, and a transmission connecting said motor with the carriage trailing in said feeding direction for driving said trailing carriage in said feeding direction, said transmission including a high speed stage and a working speed stage; a clutch having an input part driven from said motor and an output part connected with said trailing carriage for movement therewith; and control means for shifting said transmission between said stages and being actuated by relative movement between said input and output parts so that when said trailing carriage driven by the high speed stage of said transmission transports a workpiece at said high speed to a position abutting the trailing end of a workpiece transported by the leading carriage at the working speed, said trailing carriage is slowed down and causes relative movement between said input and output parts so that said transmission is shifted by said control means to the working speed stage.

2. An apparatus as claimed in claim 1 wherein said transmission includes a first coupling in said high speed stage and a second coupling in said working speed stage; and wherein said control means is connected to said first and second couplings for engaging any one of said couplings when disengaging the respective other coupling.

3. An apparatus as claimed in claim 2 wherein said control means includes a control switch closed upon relative movement of said output and input part of said clutch, and wherein said first and second couplings are electrically operated and connected with said control switch.

4. An apparatus as claimed in claim 3 wherein said control means include a cam secured to said output part for rotation therewith, a cam follower non-rotatable relative to said input part and being axially movable, said cam follower being displaced by said cam upon relative turning movement between said input and output parts, and operating said control switch.

5. An apparatus as claimed in claim 1 wherein said control means includes a cam secured to said output part for rotation therewith, a cam follower non-rotatable relative to said input part and being axially movable, said cam follower being operatively connected with said transmission means to cause shifting of the same between said stages when displaced by said cam upon relative movement between said input and output parts.

6. An apparatus as claimed in claim 1 including a second transmission connecting said motor with the carriage leading in said feeding direction and including a high speed stage for moving said leading carriage in said return direction, and a working speed stage for moving said leading carriage in said feeding direction; and means for rendering said working speed stage of said second transmission operative while said high speed stage of said first mentioned transmission is effective to move said trailing carriage at said high speed to the position in which the workpiece transported thereby abuts the workpiece transported by said leading carriage, and while said second carriage is moved at said working speed upon actuation of said control means so that said workpieces move in end-to-end relation past said cutting means.

7. An apparatus as claimed in claim 1 wherein said transmission includes a first coupling in said high speed stage and a second coupling in said working speed stage, said first coupling having an output part driving said input part of said clutch; and wherein said control means, when actuated, render said second coupling operative.

8. An apparatus as claimed in claim 7 wherein said first and second couplings have first and second input gears meshing with each other; wherein said second coupling has an output gear; wherein said output part of said clutch has a gear meshing with said output gear of said second coupling; and wherein said output gear of said second coupling is operatively connected with said trailing carriage for driving the same in said feeding direction; and comprising means for driving said carriages at high speed in said return direction.

References Cited
UNITED STATES PATENTS

| | | | |
|---|---|---|---|
| 672,872 | 4/1901 | Dreyer | 82—20 |
| 2,328,002 | 8/1943 | Gall | 82—20 |
| 2,389,556 | 11/1945 | Siegerist | 82—20 |
| 2,427,322 | 9/1947 | Darner | 82—20 |
| 3,296,902 | 1/1967 | Pfeiffer | 82—20 |

HARRISON L. HINSON, *Primary Examiner.*